United States Patent [19]

Hanke

[11] 3,882,869

[45] May 13, 1975

[54] WATER-DISPERSIBLE PLASTIC TAMPON INSERTION TUBES AND THE LIKE

[75] Inventor: David E. Hanke, Neenah, Wis.

[73] Assignee: Kimberly-Clark Corporation, Neenah, Wis.

[22] Filed: Jan. 31, 1972

[21] Appl. No.: 222,117

Related U.S. Application Data

[63] Continuation of Ser. No. 21,195, March 19, 1970, abandoned.

[52] U.S. Cl. ............... 128/263; 106/171; 106/189; 106/193 R; 260/18 R
[51] Int. Cl. ...................... C08h 9/00; C08b 27/44
[58] Field of Search ............ 128/263, 270; 106/171, 106/189, 143, 197; 260/18 R

[56] References Cited
UNITED STATES PATENTS

| | | | |
|---|---|---|---|
| 2,477,292 | 7/1949 | Fessenden | 128/271 X |
| 3,192,173 | 6/1965 | Merrall | 260/37 AL |
| 3,314,809 | 4/1967 | Klug | 106/197 R |
| 3,406,031 | 10/1968 | Lee | 106/171 |
| 3,431,909 | 3/1969 | Krusko | 128/285 |

OTHER PUBLICATIONS

Chem. Abst. 53; 14504i–14505a, 1959

*Primary Examiner*—Theodore Morris
*Attorney, Agent, or Firm*—Daniel J. Hanlon, Jr.; William D. Herrick; Raymond J. Miller

[57] ABSTRACT

A water-dispersible insertion device for tampons, suppositories and the like comprising tubes made from thermoplastic water soluble polymer compounded with water-insoluble fillers.

7 Claims, No Drawings

WATER-DISPERSIBLE PLASTIC TAMPON INSERTION TUBES AND THE LIKE

REFERENCE TO RELATED APPLICATION

This application is a continuation of application Ser. No. 21,195 filed Mar. 19, 1970 now abandoned.

BACKGROUND OF THE INVENTION

Tampon insertion devices of the tube type are often disposed of by dropping them in the toilet bowl. Accordingly, it is desirable that such tubes be made of material which softens and loses its form in water, and eventually is dispersed.

For this purpose, it has been proposed (in U.S. Pat. No. 3,419,005 and others) to fabricate tubes from multiple paper strips spirally wound into the shape of a tube with the plies bound together by water-soluble adhesives. Preferably, the paper or adhesive also contains a surfactant wetting agent to aid in attracting water to the bonded regions and to facilitate the breaking up of the tube structure.

It has also been proposed (in U.S. Pat. No. 3,433,225) to mold the tubes out of plastic such as polyethylene, polypropylene or polystyrene, in quarter or half sections, and to join these sections with a water soluble or water loosenable adhesive such as methyl cellulose in alcohol. The patent suggests that a tube having a sectional construction of this type can be flushed down a toilet without danger of clogging. While this may be true, such construction is at a disadvantage because the described plastic sections themselves are not water-dispersible or biodegradable.

Another tube which recently appeared in the market place and which is not water-dispersible in any sense comprises an injection molded or extruded tube made completely of a flexible thermoplastic material such as polyethylene or polypropylene. The smooth surface, hygienic appearance and cosmetic feel of these tubes make them quite attractive from an aesthetic and marketing standpoint. In addition, since they may be fabricated by injection molding or extrusion they are also attractive from a cost and manufacturing standpoint. However, such tubes suffer from the disadvantage that the thermoplastic materials used are not water-soluble and therefore will not disintegrate or degrade when disposed of in a toilet system.

One additional suggestion found in the related art has been to form a single dose dispenser for use in body cavity injection from a water-soluble polyvinyl alcohol (U.S. Pat. No. 2,518,486). However, such a tube has been found to be relatively unstable in the presence of moisture laden air, becomes prematurely sticky in contact with moist surfaces, and is costly to fabricate since it must be cast from solution and then moulded to shape. up to this time, a satisfactory disposable tube which performs well under use conditions and in which the entire structure comprises water-dispersible plastic has not been available.

This invention is directed to a plastic insertion tube which has the marketing and cost advantages of known water-insoluble plastic tubes and yet is water-dispersible.

SUMMARY OF THE INVENTION

The improved tampon insertion devices of this invention broadly comprise tubes made from a thermoplastic, normally water-soluble polymer, compounded with low cost clays, talc, wood flour, fibers and the like. The tubes are injection molded or extruded to obtain the desired shape and configuration. The preferred thermoplastic materials are polyethylene oxide polymers having a molecular weight of from about 100,000 to about 2,000,000, a Brookfield viscosity in the range of 8,000-12,000 cps for a 5% aqueous solution, and a melting point of about 65°C; and hydroxypropyl cellulose polymers with a molecular weight of about 75,000 to about 375,000, a Brookfield viscosity in the range of 75–1200 cps for a 5% solution, and a softening point of about 130°C. The addition of compatible cross-linking agents, surfactants, glycols and glycerides or similar plasticizers, anti-oxidants, and processing lubricants are also contemplated. Tubes compounded in the above manner are characterized by a smooth flexible cosmetic surface, have less tendency to adhere to moist mucous membrane and epidermal tissue, yet will disperse readily in water when disposed of in a toilet.

Accordingly, it is an object of this invention to provide improved devices for use in inserting tampons or the like into body cavities, such devices being adapted for disposal in water base toilet systems without danger of causing stoppages of same.

Other objects and advantages will become apparent by referring to the following description of preferred embodiments.

DESCRIPTION OF PREFERRED EMBODIMENTS

By way of example, a typical tampon applicator incorporating the invention may comprise an outer tube approximately 3 inches long and one-half inch in diameter with a wall thickness of from less then one sixty-fourth to about three sixty-fourths inch, and an inner tube of similar length and wall thickness but having an outer diameter slightly less than one-half inch, or sufficient to lightly frictionally engage the outer tube while in telescopic association therewith. Tube elements of approximately the above dimensions may be fabricated in their simplest form by injection molding a water-dispersible compounded plastic of the following formula:

100 parts by weight hydroxypropyl cellulose having a molecular weight of about 75,000, and 100 parts by weight of talc.

The resulting tubes have a smooth outer surface with excellent molding characteristics. The walls are sufficiently rigid to resist denting, yet have a resilience which permits a reasonable amount of distortion or bending without causing permanent deformation. The smooth, wax-like surface exhibits a low coefficient of friction which facilitates easy insertion into a vaginal cavity under both dry and moist conditions. When these applicator tubes are dropped in water they begin to soften and dissolve in a short time and in due course disperse completely.

Tubes made of the same polymer, but devoid of compounding materials, initially exhibit a smooth surface. However, the surface becomes sticky in contact with small amounts of moisture, thus making insertion difficult and uncomfortable. This tendency to become sticky also reduces the aesthetic qualities of the device.

In addition to improving insertion characteristics, the addition of compounding materials to the water-soluble polymer has other advantages. First, the presence of fillers improves the rate of water-dispersibility, which is particularly unexpected when talc is used in the large proportions used in the example described above, because of the natural hydrophobicity of talc. Second, it gives the tube an opaque, more hygienic appearance, which adds further to the impression of softness. And third, it provides desirable production economies in that a large part of the costly polymer ingredient is replaced by less costly fillers and extenders.

Another compounded polymer formulation found to give excellent results when formed into a tube is comprised of 100 parts by weight of polyethylene oxide having a molecular weight of about 600,000, i.e., WRPA-3154 manufactured by Union Carbide Corporation and sold under the Trademark POLYOX; 50 parts by weight of talc; 4 parts ethylene glycol; 4 parts $TiO_2$; and 5 parts non-ionic surfactant, i.e. a nonylphenyl polyglycol ether.

Tubes made of the above material also have a very smooth, waxy surface feel and a low frictional resistance under both dry and wet conditions, providing easy insertion characteristics.

Because both of the above-mentioned formulations are readily extrudable or injection moldable it can be seen that, in addition to the plain tubes described earlier, tubes of various other shapes and configurations may be easily made. For example, the leading end of the outer tube may have a conical shape formed from flexible petal-like segments to provide an easy-opening, small insertion tip which facilitates insertion as well as protecting the tampon contents prior to insertion. Also, the ejector tube element may be made of much smaller diameter to cooperate with a small diameter collar disposed at the base of the outer tube, as is done in some current polyethylene tube designs. An important contribution of this invention is the development of plastic tubes construction which provides all the desirable aesthetic and functional characteristics now found in water-insensitive, non-dispersible plastic insertion tubes, yet which tubes may be disposed of in a water base sanitary system with the assurance that they will disintegrate and completely disperse in due course.

In addition to the rather simple and specific formulations mentioned above, a wide range of mixtures including a number of other fillers and extenders may be included in the tube structure. In supplementing or replacing the talc one may use other finely ground insoluble fillers such as hydrated calcium and magnesium silicates which have varying water sensitivity. Paper coating clays are also useful. Lubricants for plastics such as magnesium or zinc stearate may also be used to improve plastic flow in the molding devices.

Fillers or extenders such as wood flour, walnut shell flour, alpha cellulose floc, short cellulose fibers and the like may be added. The addition of compatible cross-linking agents, and plasticizers such as glycerine, glycols and glycerides, all of which are commonly used in compounding plastics are also possible. Previously mentioned non-ionic surfactants also serve a useful purpose. The criterion, of course, is that any material employed in the compounding should be non-toxic and should not interfere with the eventual water-dispersibility of the formed tube.

Useful ranges for the water-soluble polymers and the compounding materials mentioned are as follows:

25–95% thermoformable hydroxypropyl cellulose or polyethylene oxide

50–75% talc, clay, finely ground inorganic fillers, and mixtures thereof

1–10% small particle cellulose extenders including wood flour, walnut shell flour, alpha cellulose floc, short cellulose fibers, and mixtures thereof 1–5% glycerine, ethylene glycols, or glycerides 1–5% zinc or magnesium stearate 1–5% glycerine monostearate 0.1–10% non-ionic surfactant such as nonyephenyl polyglycol ether containing less then 65 oxyethylene units. One such agent being TERGITOL NP-33 from Union Carbide Corporation 0.1–1% phenolic antioxidant stabilizer such as 2.6 ditertiarybutyl-p-cresol; or 1, 3, 5 trimethyl - 2, 4, 6 tris [3, 5 - ditertiarybutyl, 4 hydroxy benzyl]benzene, the latter being sold as IONOX 330 by the Ethyl Corporation.

The hydroxypropyl cellulose may also be modified with from 1 to 5% polyvinyl acetate without destroying its water-dispersibility characteristics.

Injection molding or extrusion is the preferred method of fabricating the tubes for economy reasons. However other forming methods may be used.

While the emphasis has been placed on the use of the described applicators as tampon depositors, it will be seen that they are also adaptable for use in the insertion of suppositories and the like materials.

What is claimed is:

1. An improved water-dispersible insertion device for tampons and the like comprising at least one thin-walled tubular member in which the walls thereof are comprised of a thermoformed, injection-molded water-soluble polymer compounded with water-insoluble fillers, said polymer being selected from the group consisting of polyethylene oxide polymers having a molecular weight from about 100,000 to about 2 million and an hydroxypropyl cellulose polymer having a molecular value of from about 75,000 to about 375,000 said filler being present in the amount of from about 50 to about 75% by weight, and said filler being selected from the group consisting of talc, clay, and hydrated silicates.

2. The device of claim 1 in which said compounded polymer also contains a lubricant selected from the group consisting of magnesium stearate, zinc stearate and glycerine monostearate.

3. The device of claim 1 in which said compounded polymer also contains small particle cellulosic extenders.

4. The device of claim 1 in which said compounded polymer also contains a compatible plasticizer in the amount up to about 5%.

5. The device of claim 1 in which said compounded polymer also contains a non-ionic surfactant.

6. The device of claim 1 in which said compounded polymer also contains a stabilizing phenolic antioxidant, said antioxidant being selected from the group consisting of 2, 6 ditertiarybutyl-p-cresol, and 1, 3, 5 trimethyl-2, 4, 6, tris [3,5-ditertiarybutyl, 4 hydroxy benzyl]benzene.

7. The device of claim 1 in which said device comprises a pair of telescoping tubes.

* * * * *